(12) United States Patent
Brown

(10) Patent No.: US 6,909,553 B2
(45) Date of Patent: Jun. 21, 2005

(54) MULTI-APERTURE BEAM INTEGRATOR/ METHOD PRODUCING A CONTINUOUSLY VARIABLE COMPLEX IMAGE

(75) Inventor: Daniel Brown, Madison, AL (US)

(73) Assignee: Mems Optical, Inc., Huntsville, AL (US)

(*) Notice: Subject to any disclaimer, the term of this patent is extended or adjusted under 35 U.S.C. 154(b) by 0 days.

(21) Appl. No.: 10/211,320

(22) Filed: Aug. 5, 2002

(65) Prior Publication Data

US 2003/0063390 A1 Apr. 3, 2003

Related U.S. Application Data

(60) Provisional application No. 60/309,482, filed on Aug. 3, 2001.

(51) Int. Cl.$^7$ .............................................. G02B 27/10
(52) U.S. Cl. ...................... 359/621; 359/626; 359/619
(58) Field of Search ................................ 359/621–624, 359/619, 625, 626, 628

(56) References Cited

U.S. PATENT DOCUMENTS 6,552,760 B1 * 4/2003 Gotoh et al. ................... 349/56

* cited by examiner

*Primary Examiner*—Ricky Mack
(74) *Attorney, Agent, or Firm*—Keady, Olds, Maier & Richardson, PLLC

(57) ABSTRACT

A multi-aperture beam integrator system/method for producing an polygon or other complex optical pattern on an image plane, which can be continuously varied in size, aspect ratio, or shape, is described. The integrator/method uses optical array elements having various phase functions, which can be combined to create optical patterns. Varying the location of the optical array elements with respect to each other and/or moving individual unit cells contained within the optical array elements can create continuously varying optical patterns at a desired location.

48 Claims, 6 Drawing Sheets

55 Waist of "I" beam
70 Actuator part of slide actuator 50

A

B

C

D

E

F

A

B

C

D

E

F

MULTI-APERTURE BEAM INTEGRATOR/ METHOD PRODUCING A CONTINUOUSLY VARIABLE COMPLEX IMAGE

CROSS REFERENCE TO RELATED APPLICATIONS

This application claims priority under 35 U.S.C. § 119(e) of provisional application U.S. Ser. No. 60/309,482 filed on Aug. 3, 2001 which is hereby incorporated by reference in its entirety.

BACKGROUND OF THE INVENTION

1. Field of the Invention

The present invention relates to near-field beam shaping of laser beams, particularly high powered laser beams used for machining, marking, materials processing, and alignment. It also relates to beam integration for the purpose of homogenization of light sources to produce a uniform irradiance on an image plane.

2. Description of Related Art

A common method of shaping laser beams into patterns for product marking and machining involves the use of masks. The laser beam impinges upon a mask, which blocks a portion of the laser letting the unblocked portion through the mask resulting in the desired shape. Blocking a portion of the laser removes a portion of the available laser energy and results in inefficient use of the available laser energy, causing increased fabrication time and cost and heating of the mask.

The use of multiple lenses (multi-aperture) to create various shaped illuminations is referred to as multi-aperture beam integration, and the devices performing beam integration are referred to as multi-aperture beam integrators. Recent interest in multi-aperture beam integration has led to the discussion of on-axis multi-aperture beam integration using refractive elements. FIG. 1 illustrates the basic elements of an on-axis multi-aperture beam integrator. Laser light 110 of diameter "D" is incident upon a segmentation array element 120. The segmentation array element 120 has refractive lens arrays, which divide the laser light into multiple beams 140. The refractive lens arrays have refractive lens elements 130 having diameter "d" and focal length "f" (not shown). The multiple beams 140 are incident on a integrator lens 150, which has a focal length "F", and integrates the multiple beams 140 so that they overlap in a region whose spot size "S" can be expressed as:

$$S = \frac{F}{f/d} \quad (1)$$

The difficulty with on-axis, refractive, segmentation array elements is the ability to form complex patterns. For example, to form a ring pattern a conical refractive lens element 130 is needed. Because of etching errors the sharp conical shapes needed are difficult to fabricate. The rounding of sharp edges results in unrefracted light causing stray light irradiance on the image plane instead of the desired pattern.

There are essentially four devices used to form optical patterns with lasers; masks, refractive lenses, reflective lenses and diffractive lenses. Diffraction occurs when light passes through a periodic structure, whose dimensions are comparable to the wavelength of light. When the structure dimensions are much greater than the wavelength then the diffraction effect is less, but refraction and reflection may still occur. Diffraction can be caused by illumination of a periodic structure, where the periodic structure can be thought of as a plurality of periodic sources. Periodic sources interfere with each other allowing various high and low intensity shapes.

FIG. 2 illustrates a simple periodic diffractive surface, in this case plural phase grating structures 210a–d. The periodic structure segments an incoming wavefront and adds a phase tilt to each segment. When the wavefront segments are stitched back together into a continuous wavefront, the phase and direction of travel of the wavefront has been clearly modified by the periodic structure. For this reason, these periodic structures are often referred to as phase gratings. Each phase grating has an associated phase function describing the phase grating's effect on an illuminating beam's phase upon traversing the grating. The grating shown is FIG. 2 is illuminated by an incident laser beam of wavelength $\lambda$ upon the planar side. As indicated by the grating equation shown in the figure, the amount of local wavefront tilt $\theta$ or phase depends on the structure period w. The $0^{th}$ and $1^{st}$ order diffraction waves are shown. Structure depth errors and rounding of the sharp corners, which are unavoidable to varying degrees in every manufacturing process, contribute to the presence of the zero-order light. Diffraction gratings provide the ability to generate complicated wavefront shapes and irradiance patterns.

The primary obstacles to using diffraction elements to form complicated shapes are their wavelength dependence and the existence of the $0^{th}$ order diffracted light on the image plane or region of pattern formation. The first can be mitigated with lower dispersion refractive or reflective elements. The second can be mitigated with tighter fabrication tolerances or using an off-axis design which allows the zero-order light to become spatially separated from the first-order light at the image plane. An obstacle that is typical of multi-aperture beam integrators is their limitation to fixed intensity shapes at fixed distances, not allowing continuous shaping of the intensity pattern. This obstacle is addressed by this patent.

Typical multi-aperture beam integrators use refractive, reflective, or diffractive lenses. For example, Mori et al. (U.S. Pat. No. 5,594,526) shows a projection exposure apparatus forming a plurality of light source images using multi-aperture beam integrators. However, the lenses and lens arrays of Mori are fixed and the patterns created limited to rectangular or circular fixed patterns.

SUMMARY OF THE INVENTION

It is the object of this present invention to provide a beam shaper for lasers and other collimated light sources.

It is an object of the present invention to provide a beam shaper for laser and other collimated light sources, which utilizes nearly 100% of the source light.

It is an object of the present invention to provide a beam shaper for laser and other collimated light sources, which utilizes nearly 100% of the source light for forming complex optical patterns on an image plane.

It is an object of the present invention to provide a beam shaper for laser and other collimated light sources, which utilizes nearly 100% of the source light, for forming complex optical patterns on an image plane, whose magnification can be continuously varied.

It is an object of the present invention to provide a beam shaper for laser and other collimated light sources, which utilizes nearly 100% of the source light, for forming complex optical patterns on an image plane, whose aspect ratio, or other image characteristics can be continuously varied.

It is an object of the present invention to provide a beam shaper for laser and other collimated light sources, for forming complex optical patterns on an image plane, using translating/rotating lenslet arrays.

It is an object of the present invention to provide a beam shaper for laser and other collimated light sources, for forming complex optical patterns on an image plane, using translating/rotating lenslets.

It is an object of the present invention to provide complex optical pattern(s) that is/(are) continuously and directly varied by relative translations between multiple transparent substrates.

These and other objects of the present invention may be realized by using arrays of lenslets, which lenslets are, in general, non-rotationally symmetric. A lenslet array is constructed from a group (unit cell) of lenses (lenslets) configured to create a pattern replicated in an array on a substrate forming a lenslet array. The lenslets of a unit cell of a particular lenslet array may interact with a different unit cell from a different lenslet array to form a pattern. The pattern may be continuously changed by varying the relative positions of the lenslet arrays, if more than one lenslet array is used, and/or by moving individual unit cells within a lenslet array. The lenslet arrays are, in general, not identical, and the lenslets within one array element are not identical. The lenslets may be refractive, diffractive, or reflective, or a combination of these. Each lenslet has a phase function associated with the lenslet's affect on incident light.

A lenslet array may be formed from one or more transparent substrates, where one substrate has been etched to form a continuously varying surface. The continuously varying surface forming the lenslets and unit cells of a lenslet array. The discussion herein should not be interpreted to limit the meaning of unit cell and lenslet to individually separable elements.

A lenslet from one lenslet array may be paired with a lenslet from a second lenslet array. Each pair of lenslets forms one side of the polygon image or one segment of the complex image. The lenslets may be of various shapes, movable (rotational/translational) in the plane of the array (attached to moveable unit cells) and the arrays may be moveable with respect to each other.

An optical element may be placed between the source of light and the lenslet arrays, so as to break the light source's illumination into separate beams. The separate beam's illuminate associated lenslets without appreciable loss of the illuminating beams energy. The optical element may be a segmentation array element of Galilean telescopes placed ahead of the movable lenslet arrays.

The lenslet arrays and unit cells may be moveable (rotated/translated) by an actuator or other equivalent device. The moveable lenslet arrays may be placed close to each other so that the individual phase functions of the respective lenslet arrays add together directly without having to take into account wavefront propagation between the two, adding to the complex patterns that may be formed.

Further scope of applicability of the present invention will become apparent from the detailed description herein. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein and the accompanying drawings, which are given by way of illustration only, and thus are not limitative of the present invention, and wherein.

DESCRIPTION OF PREFERRED EMBODIMENTS

As noted above, typical multi-aperture beam integrators, utilize refractive, reflective, or diffractive lenslets at fixed locations to acquire limited fixed patterns. To obtain controllable complex polygon patterns that may be continuously varied, lenslets arrays are needed where the lenses, lenslet arrays, and/or the unit cells of the lenslet array are moveable.

One or more lenslet arrays may be oriented so as to add their associated phase functions resulting in more complex patterns. The phase functions are varied by lateral, longitudal, or rotational movement of the arrays. Additionally each unit cell within the array containing a subset of lenslets may be moved on the plane of the lenslet array allowing more flexibility in pattern formation.

Figure 1:
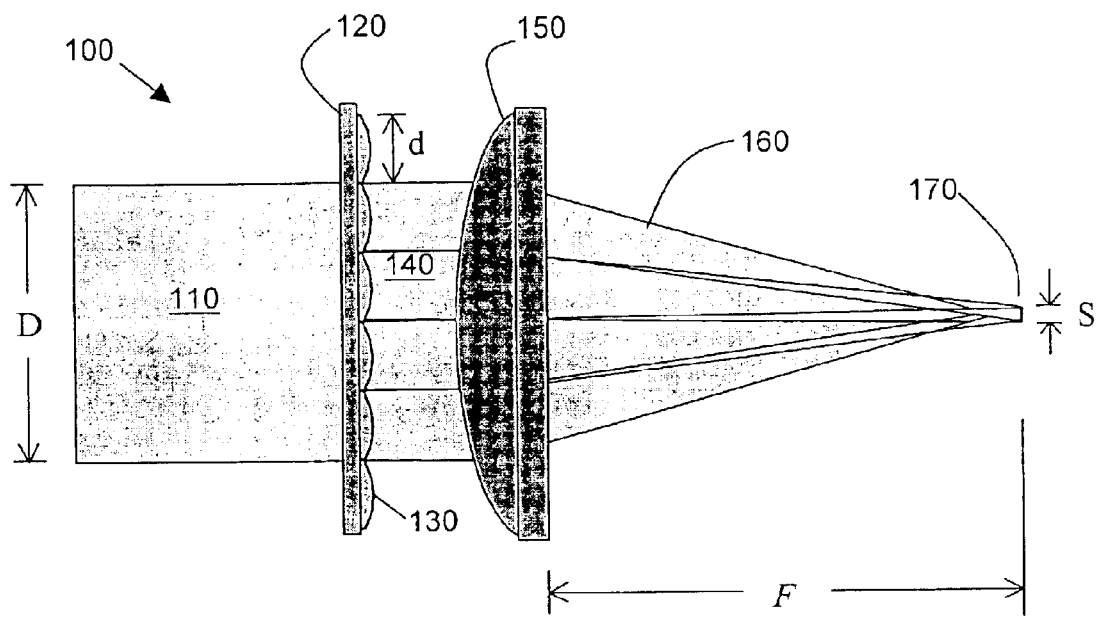
FIG. 1 is an illustration of an on axis multi-aperture beam integrator.
Figure 2:
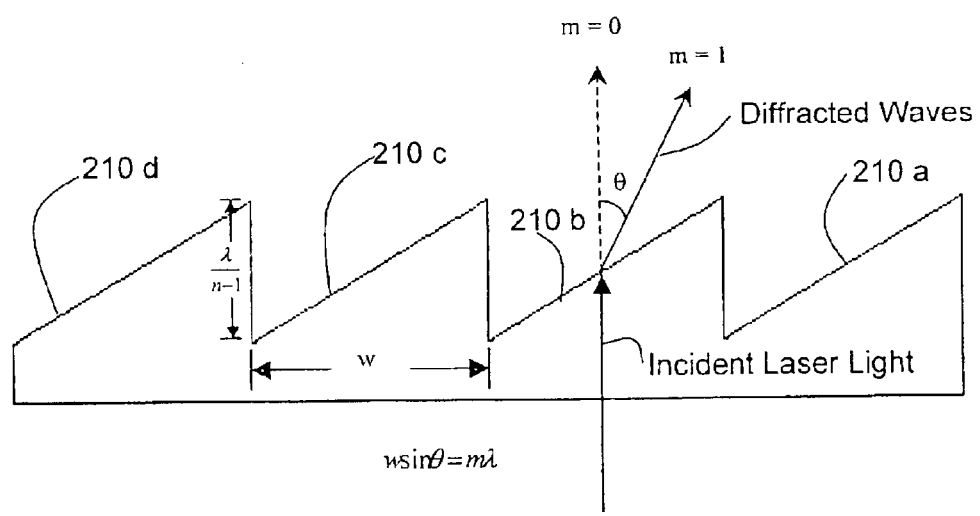
FIG. 2 is a schematic showing a simple diffraction grating bending a laser beam illuminating the periodic structure.
Figure 3:
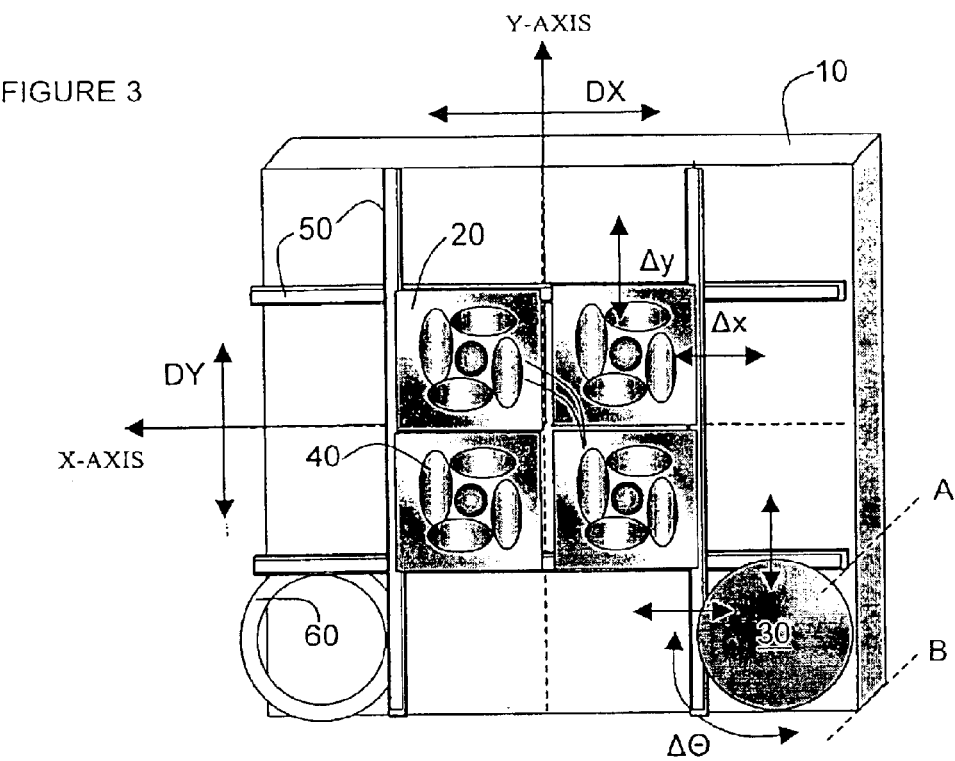
FIG. 3 is a schematic showing moveable individual lenslets arranged on a lenslet array.

Each unit cell may translate or rotate in the plane of it's respective lenslet array FIG. 3 illustrates a lenslet array 10 according to the present invention. The example shown in FIG. 3 has a lenslet array 10 with five unit cells (four unit cells 20, and one unit cell 30), however the present invention is not limited to a certain number of unit cells. Each unit cell contains a group of lenslets 40 that are designed to form a desired pattern when illuminated. Each lenslet 40 may be different from each other, and may be either refractive, reflective, diffractive, or any combination of these. The group of lenslets forming the desired pattern define a unit cell 20 and/or 30, which are replicated on a substrate forming a lenslet array 10. The planar surface of the lenslet array defines orthogonal axes 'x' and 'y' with the 'z' direction orthogonal to the planar surface (either parallel or anti-parallel to the normal of the surface). The unit cells 20 and/or 30 may translate in the plane in the x or y direction and may be moved by slide actuators 50. Each slide actuator 50 may contain slots in which the unit cells fit, and an underlying actuator that translates the unit cell along the slide actuator direction. Additionally, a slide actuator may be used to translate the entire array in the longitudinal (z) direction. Other actuator designs may translate the unit cell and the discussion herein should not be interpreted to limit the invention to a slide type actuator. Unit cells in addition to translation may also rotate. FIG. 3 shows a circular unit cell 30, which may rotate, $\Delta\Theta$, about an axis normal to the plane of the lenslet array using a circular slide actuator 60. A combination of both translation and rotation allows more complex patterns to be formed and continuously altered. The slide actuators may be etched or machined into the substrates containing the unit cells or formed separately and then connected.

The lenslets may be formed of transparent materials used for diffractive gratings and/or refractive lenses, such as glass, $SiO_2$, silicon, etc. or of reflective materials such as metals. The use of materials should not be limited to these, and any material that satisfies the conditions satisfying the optical properties needed for a particular configuration should be interpreted as falling within the scope of the present invention. While the preferred embodiment is intended to operate in conjunction with coherent emissions from any laser source, the principles of the present application are applicable to any suitably collimated electromagnetic energy which can be optically diffracted.

Figure 4A:
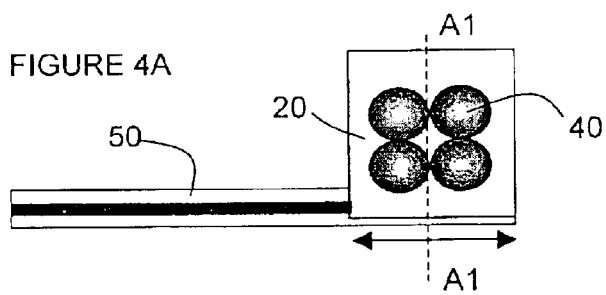
FIG. 4A is an illustration of a unit cell containing lenslets connected to a slide actuator.
Figure 4B:
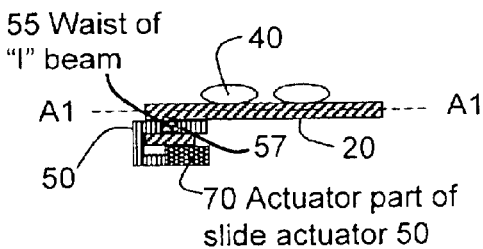
FIG. 4B is a cross-sectional view of the unit cell of FIG. 4A.

FIG. 4A shows a unit cell 20 with associated lenslets 40 attached to a slide actuator 50. (It is noted that although the figures illustrate the lenslets as being rotationally symmetric, in general they are not rotationally symmetric, but nonsymmetric.) FIG. 4B illustrates the cross-section of the unit cell of FIG. 4A containing a waist portion 55 (of the "I" beam portion) The unit cell is operatively connected to the slide actuator 50 through the waist portion 55. The waist portion of the unit cell fits in a slot 57 in the slide actuator 50. An actuator 70, operatively connected to the unit cell, translates the unit cell, which slides along the slot portion of the slide actuator.

Figure 4C:
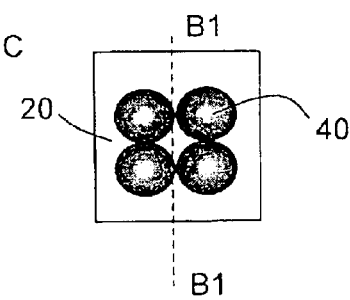
FIG. 4C is an illustration of a unit cell containing lenslets.
Figure 4D:
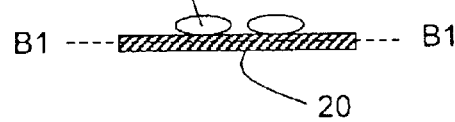
FIG. 4D is a cross-sectional view of the unit cell of FIG. 4C.

FIGS. 4C and 4D show the associated unit cell and cross-section of the unit cell shown in FIG. 4A, where the unit cell is not translatable.

Figure 5:
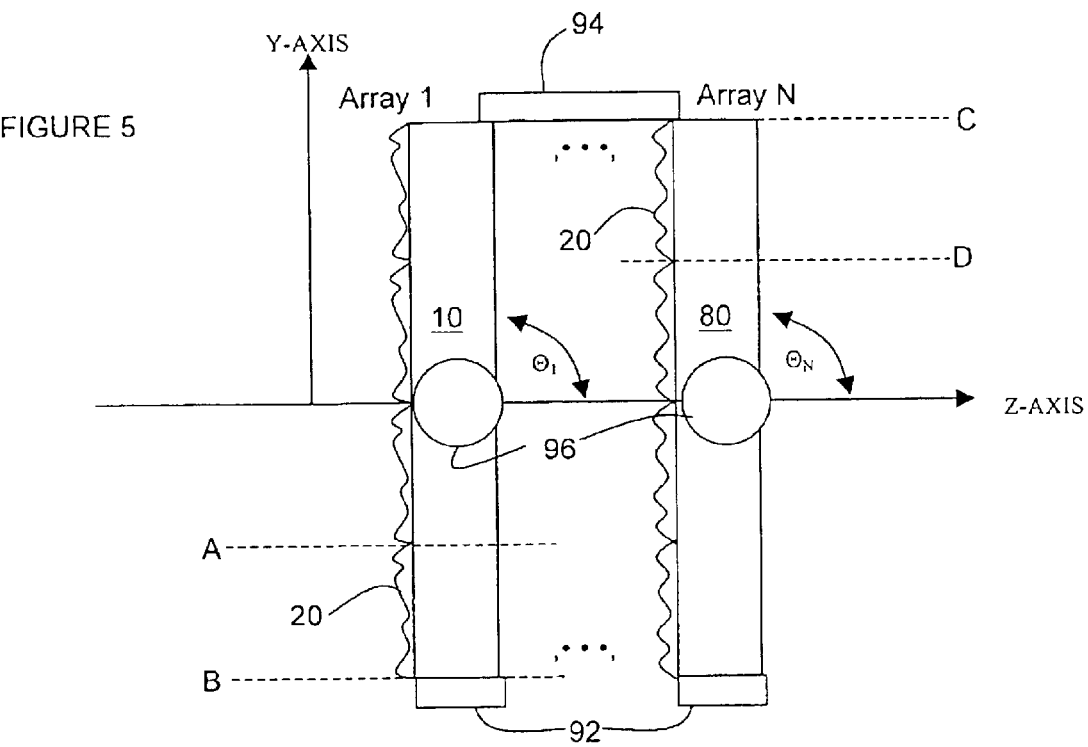
FIG. 5 is an illustration of N moveable lenslet arrays conforming to an embodiment of the present invention.

Complicated patterns may be formed by one lenslet array as shown in FIG. 3 or may be formed by the interaction of two or more lenslet arrays. FIG. 5 illustrates a side view of N lenslet arrays 10, 80 according to another embodiment of the present invention. A lenslet array 10, 80 is the assemblage of unit cells 20 lying in the lenslet array plane. A lenslet array may be a continuously varying transparent substrate. A unit cell can include one or more lenslets (e.g. lenslet 40 in FIG. 3), each of which may have a different phase function or surface profile from its neighbor in the unit cell. A larger unit cell size allows greater flexibility to shape the intensity pattern on the target, but reduces the amount of beam homogenization. Thus one makes a tradeoff between homogenization and pattern shape flexibility.

The z-axis is defined by the original path direction of the incident light from left to right. In FIG. 5 first lenslet array 10, and the Nth lenslet array 80 are oriented perpendicular to the z-axis. This should not be interpreted to limit the orientation of any lenslet array, which may be non-perpendicular to the z-axis. In fact the lenslet arrays may be tilted some angle $\Theta_1$ and $\Theta_N$ by use of rotational devices 96. Additionally the lenslet arrays may be translated with respect to each other by translation devices 92, and 94. The translation device may be an actuator or another method of translating the lenslet arrays. For example the translation device may be screw gears attached to one array with a stationary thread in the other lenslet array. As the screw gear is turned the lenslet arrays translate longitudinally with respect to each other. If the translations/rotations are small (e.g. 100 microns or less), the translational/rotational devices 92, 94, 96, can be piezoelectric drives.

The lenslet arrays can also be rotated about their respective normals by devices 92 and/or 94 and/or 96. For example, in FIG. 5 with the tilted angles, $\Theta_1$ and $\Theta_N$, at 90 degrees, the lenslet array 10 and/or 80 may be rotated about the z-axis by the inclusion of gear grooves on the edge of the lenslets 10 and/or 80 and a screw gear translator device used for device 92. For example if the translational motion of lenslet array 10 and/or 80 are locked but the rotational motion about the z-axis free, the screw device, fitting in the gear grooves on the edge of the lenslet arrays, will rotate the lenslet array 10 and/or 80. Many other methods of rotation and translations using the lenslet arrays, translational devices and rotational devices would be obvious to one of ordinary skill in the art using the disclosure herein and the example discussed above should not be interpreted to limit the method of rotation and/or translation, to gear grooves and/or screw devices.

As shown in FIG. 3 the unit cells may move in the plane of the lenslet array. The plane of the lenslet arrays shown in FIG. 5 lie in the x-y plane (x-axis completing a right hand coordinate system), although in general the lenslet array may lie in any plane. FIG. 5 shows unit cell 20 bounded by its edges outlined by lines A and B for the first lenslet array and unit cell 20 bounded by its edges outlined by lines C and D for the Nth lenslet array. The phase function of one unit cell of one lenslet array may interact with the phase function of another unit cell in a different lenslet array, resulting in complicated image patterns.

A unit cell is the element of a lenslet array, which creates a desired pattern when illuminated The multi-beam integrator combines the patterns from all of the unit cells of a lenslet array to create a resultant pattern of uniform illumination. To increase the efficient use of laser energy, illumination of the unit cells is desired without unit cell edge illumination. Illumination of the unit cells without edge illumination may be accomplished using a segmentation array element of Galilean telescopes (e.g. segmentation array 120 in FIG. 6). The segmentation array of Galilean telescopes is placed ahead of the movable lenslet arrays, which collects the light with near 100% fill factor, segments the beam into multiple beamlets, and reduces the beam diameter of each beamlet to a dimension smaller or equal to the dimension of a unit cell. The segmentation array element is formed by fabricating positive lenses, with near 100% fill factor, on one side of a wafer and negative lenslets on the other side of the wafer, forming an afocal telescope.

Figure 6:
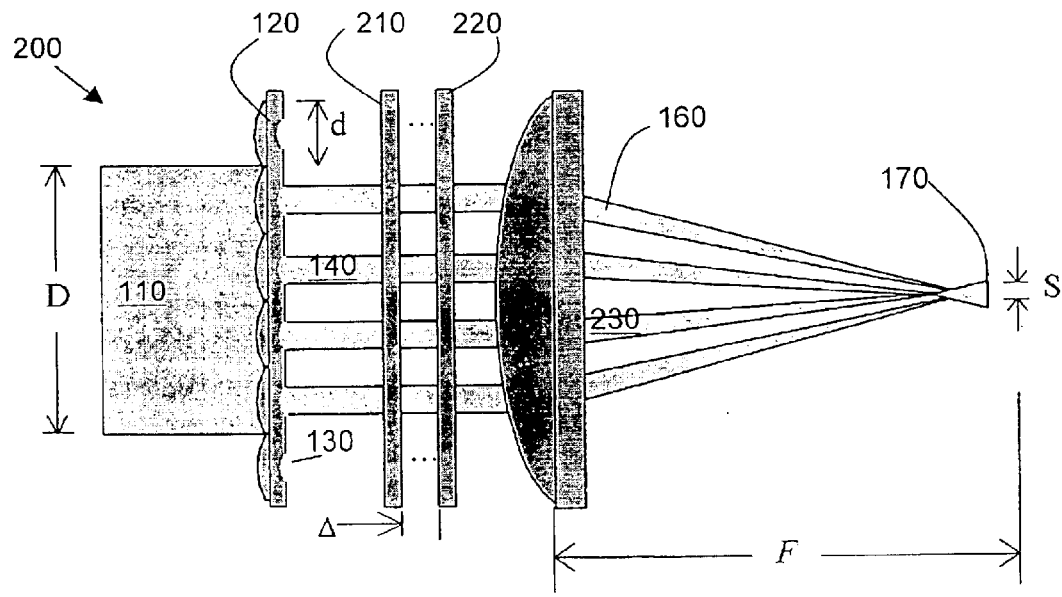
FIG. 6 is an illustration of an embodiment of the present invention containing "N" lenslet arrays with an on-axis configuration.

FIG. 6 illustrates an embodiment of the present invention 200, using an integrator lens 150 to overlap the beamlet patterns at the image plane, and using a segmentation array 120 to segment an incident beam 110 into multiple beamlets 140. Clearly, an alternate embodiment would not include the integrator lens if keeping the patterns spatially separated at the image plane were so desired. Additionally if the overlap of the beamlets is incorporated into the shape of the lenslets (beam overlap function), an integrator lens is not needed.

The segmentation array segments 130 have a dimension 'd' equal to or less than an associated unit cell on a lenslet array. One or more lenslet arrays 210, 220, intercept the multiple beams Lenslet array 210 interacts with the incident multiple beams 140 resulting in illumination beams 160 that will cross and form a complex image 170 of size 'S', a distance 'F' from the integrator lens. An embodiment of the present invention may use only one lenslet array or several. The lenslet array 210 may be rotated, translated, or tilted with respect to the segmentation array 120. Additionally, the unit cells of lenslet array 210 (not shown) may be translated or rotated in the plane of the lenslet array, as described above. To form more complex variable image (optical) patterns multiple lenslet arrays may be used, each having its own phase function. For example, to form a variable quadrilateral image, a fourlenslet unit cell on at least two arrays would be used. Each lenslet in the first array is paired with a lenslet in the second array, which working together form one side of the variable quadrilateral image In this example the lenslets would be grouped together in the arrays, each lenslet pair capable of producing a different phase function or surface profile, The group of four lenslets of one lenslet array would form a unit cell for that lenslet array and be replicated over the entire area of the array in order to achieve beam homogenization when the images are overlapped with an integrator lens or with built in beam overlap functions in each lenslet.

One method of achieving continuously variable complex images is to combine the interaction of several lenslet arrays placed adjacent to each other. Each lenslet array has associated with it a phase function that describes how an incident light's phase is changed by passing through the lenslet array. Complex shapes can be created by individual lenslet arrays or the interaction of the phase functions of two or more lenslet arrays.

The phase or surface profile of each lenslet array in the moveable arrays is described by the general polynomial of the form, $$\Phi_1 = \sum_{i=0}^{m} \sum_{j=0}^{n} a_{i,j} x^i y^j \tag{1}$$

$$\Phi_2 = \sum_{i=0}^{m} \sum_{j=0}^{n} b_{i,j} x^i y^j \tag{2}$$

where $\Phi_1$ is the phase function (or surface profile) of the lenslet in the first movable array and $\Phi_2$ is the phase function (or surface profile) of the paired lenslet in the second movable array. For the discussion herein, we assume an insignificant propagation distance between a pair lenslets so that $\Phi=\Phi_1+\Phi_2$, however this should not be interpreted to limit the present invention and larger distances may be used. Since the surface profile affects the lens thickness which affects wavefront phase added by the lens, there is no lack of generality in confining the following discussion to the phase function, $\Phi$, of the lenslet.

In general, $a_{ij} \neq b_{ij}$, nor do the same coefficients equal each other in adjacent lenslets within the same array element. To demonstrate how differences in the coefficients coupled with array translation affect the image, the first several terms of the polynomial are examined separately for three cases; $a_{ij}=b_{ij}$, $a_{ij}=-b_{ij}$, and $|a_{ij}|\neq|b_{ij}|$. The piston phase term, $a_{0,0}$, is ignored in this discussion as it only contributes interference effects with adjacent lenslets which can be considered as a separate issue from the image shape generated by the phase function. The first term in the polynomial is linear in x:

$$\Phi_{1x}=a_{1,0}x \tag{3}$$

$$\Phi_{2x}=b_{1,0}x \tag{4}$$

Assuming opposite translations of equal magnitude for the two arrays, we make the substitutions:
$x \rightarrow x+\xi$
$y \rightarrow y+\eta$
for the first array, and
$x \rightarrow x-\xi$
$y \rightarrow y-\eta$
for the second array, where $\xi$ and $\eta$ are the lateral translations of the arrays in the x and y directions. The wavefront aberration contribution for the lenslet pair due to the first polynomial term is:

$$\Phi_x=a_{1,0}(x+\xi)+b_{1,0}(x-\xi) \tag{5}$$

which is a wavefront tilt in the x-direction. The displacement on the image plane is proportional to the gradient of the phase function. Taking the gradient of $\Phi_x$, $\nabla\Phi_x=(a_{1,0}+b_{1,0})\hat{i}$, shows a constant displacement in the x direction at the image plane, independent of lenslet array translation ($\xi$). The magnitude of the displacement depends on the relative magnitudes of the coefficients and the focal length of the integrator lens In the same manner, the linear term in y results in a constant displacement in the y direction.

The wavefront aberration contribution due to the first quadratic term, $x^2$, can similarly be written;

$$\Phi_{xx}=a_{2,0}(x+\xi)^2+b_{2,0}(x-\xi)^2 \tag{6}$$

with its gradient given by;

$$\nabla\Phi_{xx}=[(2a_{2,0}+2b_{2,0})x+(2a_{2,0}-2b_{2,0})\xi]\hat{i} \tag{7}$$

For the case, $a_{2,0}=b_{2,0}$, the second term above becomes zero and the first term gives defocus or a constant optical power in the x direction. This would form a horizontal line image at the focal point of the integrator lens. For the case of $a_{2,0}=-b_{2,0}$, the first term becomes zero and the second term shows a linearly varying displacement in the x direction on the image plane, proportional to the array lateral translation distance, $\xi$. For the case of $|a_{2,0}|\neq|b_{2,0}|$, the lenslet pair provides both constant optical power in the x direction and variable lateral translation in the x direction. In this case, a horizontal line of constant length would be translated in the horizontal direction with translation of the arrays in the horizontal direction. Similar results apply to the $y^2$, term in the vertical direction.

The wavefront aberration contribution due to the cross term, xy, is given by;

$$\Phi_{xy}=a_{1,1}(x+\xi)(y+\eta)+b_{1,1}(x-\xi)(y-\eta) \tag{8}$$

with its gradient given by;

$$\nabla\Phi_{xy}=[(a_{1,1}+b_{1,1})y+(a_{1,1}-b_{1,1})\eta]\hat{i}+[(a_{1,1}+b_{1,1})x+(a_{1,1}-b_{1,1})\xi]\hat{j} \tag{9}$$

For the case, $a_{1,1}=b_{1,1}$, the lenslet pair gives defocus or constant optical power in a direction 45 degrees to the x and y axes and an optical power of the opposite sign in the orthogonal direction, producing astigmatism. However, since a negative and positive lens of the same optical power produce the same spot size at the focus of the integrator lens, this case is indistinguishable from a rotationally symmetric lens with the same optical power in both the x and y directions. For the case of $a_{1,1}=-b_{1,1}$, a vertical translation of the arrays results in a horizontal (x direction) displacement at the image plane, and a horizontal translation of the arrays results in a vertical displacement at the image plane For the case of $|a_{1,1}| \neq |b_{1,1}|$, constant optical power (defocus) and variable displacement result.

The wavefront aberration contribution due to the first cubic phase term, $x^3$, is given by;

$$\Phi_{xxx} = a_{3,0}(x+\xi)^3 + b_{3,0}(x-\xi)^3 \quad (10)$$

with its gradient given by;

$$\nabla\Phi_{xxx} = [(3a_{3,0}+3b_{3,0})x^2 + (6a_{3,0}-6b_{3,0})\xi x + (3a_{3,0}+3b_{3,0})\xi^2]\hat{i} \quad (11)$$

The first term in the gradient is a constant coma-like aberration in the x-direction, the second term is a linearly varying defocus in the x-direction, and the third term is a one-sided displacement varying quadratically in $\xi$. For the case, $a_{3,0}=b_{3,0}$, this phase term gives a constant coma-like aberration which can be displaced in the x-direction with translation of the arrays in the x-direction. For the case, $a_{3,0}=-b_{3,0}$, this phase term gives a linearly varying defocus in the x-direction proportional to x-direction translation of the arrays. For the case of $|a_{3,0}| \neq |b_{3,0}|$, a combination of coma, defocus, and displacement in the x-direction result. The fourth cubic phase term, $y^3$, produces similar results in the y-direction.

The aberration contribution for third cubic term, $xy^2$, along with its gradient is given by;

$$\Phi_{xyy} = a_{1,2}(x+\xi)(y+\eta)$$

$$^2 + b_{1,2}(x-\xi)(y-\eta)^2 \quad (12)$$

and $$\nabla\Phi_{xyy} = \hat{i}[(a_{1,2}+b_{1,2})$$

$$y^2 + (2a_{1,2}-2b_{1,2})\eta y + (a_{1,2}+$$

$$b_{1,2})\eta^2] + \hat{j}[(2a_{1,2}+2b_{1,2})$$

$$xy + (2a_{1,2}-2b_{1,2})\eta x + (2a$$

$$1,2-2b_{1,2})\xi y + (2a_{1,2}+2b_{1,2})\xi\eta] \quad (13)$$

This term produces a constant coma-like aberration for $a_{1,2}=b_{1,2}$ which can be displaced horizontally and vertically with array translation. When this cubic term is combined with the first cubic term, $x^3$, and $a_{3,0}=b_{3,0}=a_{1,2}=b_{1,2}$, the result is conventional coma with the axis of symmetry in the x-direction. In this case, the coma patch remains constant, but is laterally displaced on the image plane with the square of the array translation distances. The displacement is one-sided in x and two-sided in y.

For the case $a_{1,2}=-b_{1,2}$, a translation of the arrays in the x-direction produces a linearly varying defocus in the y-direction, resulting in a vertical line at the image plane, and a translation of the arrays in the y-direction produces defocus in both the x- and y-directions. Combined translations of the arrays in both x and y result in an astigmatic patch with its axes rotated with respect to the x-y axes. For $|a_{1,2}| \neq |b_{1,2}|$, a combination of displacement, astigmatic-like aberrations, and coma-like aberrations result. Similar results are obtained in the orthogonal directions for the second cubic term, $x^2y$, which can also be combined with the $y^3$ terms to produce conventional coma with a vertical axis of symmetry.

The wavefront aberration contribution and its gradient for the fourth order term, $x^4$, are given by;

$$\Phi_{xxxx} = (a_{4,0}+b_{4,0})(x^4+6\xi^2 x^2+\xi^4) + (a_{4,0}-b_{4,0})(4\xi x^3+4\xi^3 x) \quad (14)$$

and $$\nabla\Phi_{xxxx} = \hat{i}[(a_{4,0}+b_{4,0})(4x^3+12\xi^2 x) + (a_{4,0}-b_{4,0})(12\xi x^2+4\xi^3)] \quad (15)$$

For $a_{4,0}=b_{4,0}$, this term produces a constant spherical aberration in the x-direction and an x-direction defocus which varies quadratically with x-direction array translation. For $a_{4,0}=-b_{4,0}$, this term results in a coma-like aberration and displacement in the x-direction. This process can be carried to higher order terms.

In addition to phase function interaction, moving neighboring lenslet arrays with respect to each other may be used to continuously vary image shapes. As shown in FIG. 6 multiple lenslet arrays may be placed next to each other. For example two moveable lenslet arrays can be placed next to each other. The two movable arrays, each having a characteristic phase function, are generally placed in near proximity to each other so that the two-phase functions add together directly without having to take into account wavefront propagation between the two. Generally, the two moveable arrays are translated in opposite directions although they may also be translated in other directions parallel to their planar surfaces. When multiple lenslets are laterally translated relative to each other, the overlap region common to both clear apertures is smaller than the clear apertures of the individual lenslets It is this overlap region that is useful for modifying the wavefront. This requires that the beamlets be made smaller than the lenslets and/or unit cells in order to pass only through the overlap regions and not the invalid regions elsewhere, hence the use of a segmentation array element as discussed above. In order to achieve this, a segmentation array element of Galilean telescopes is placed ahead of the movable arrays. A simple diffractive beam splitter and collimator lens may also be used in place of the telescope array to accomplish the same purpose. A final integrator lens, following the arrays, overlaps the beamlets at the image plane, which is located at the focal point of the integrator lens.

Figure 7:
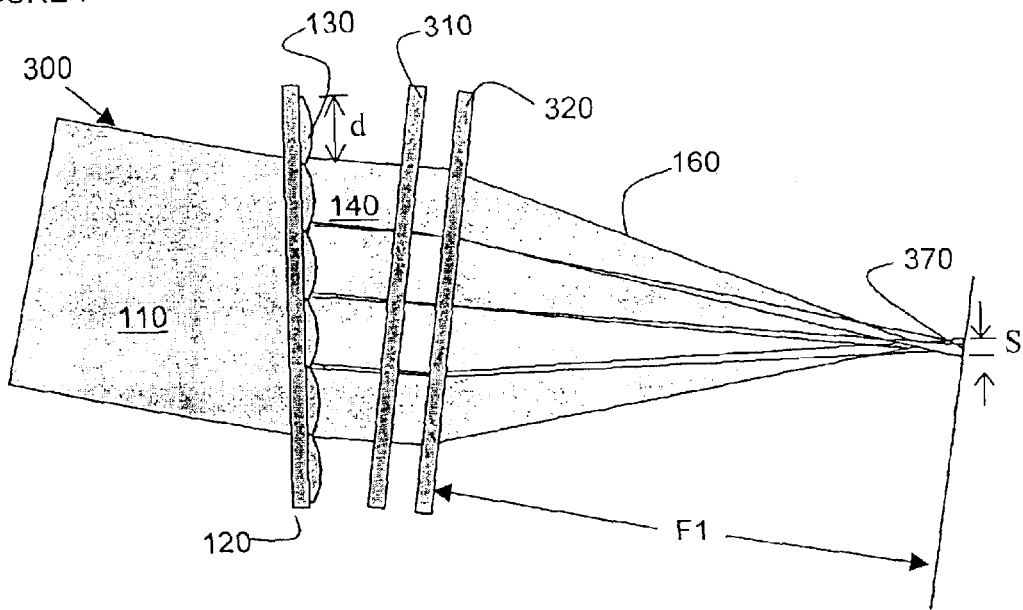
FIG. 7 is an illustration of an alternative off-axis embodiment of the present invention containing two lenslet arrays with the beam overlap function incorporated into the arrays.
Figure 8:
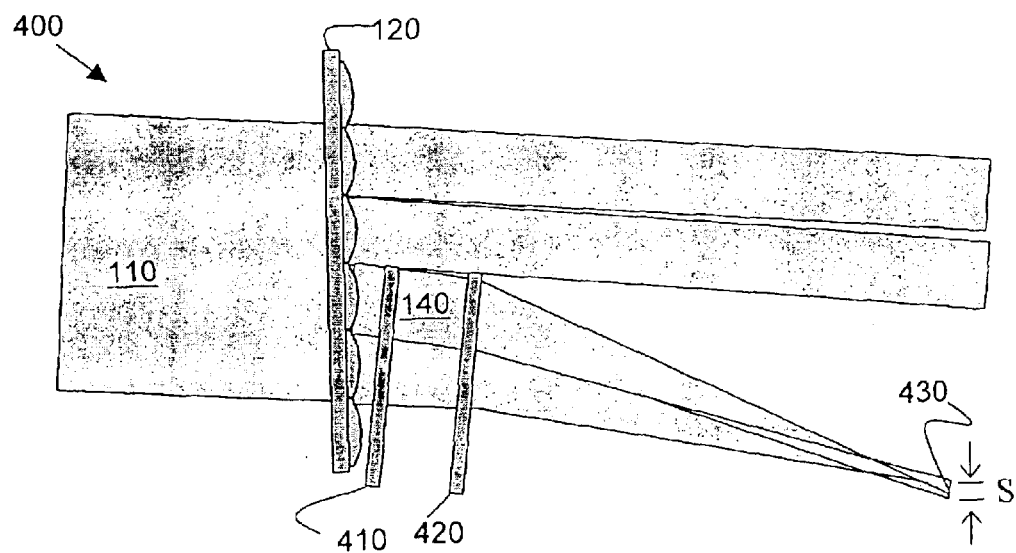
FIG. 8 is an illustration of an alternate off-axis embodiment of the present invention containing two lenslet arrays and where only a portion of the incident beams are intercepted and shaped by the moveable arrays.

FIG. 7 illustrates an additional embodiment of the present invention 300, without an integrator lens having an off-axis orientation with the total beam intercepted. The beamlet overlapping function of the integrator lens may be incorporated into either the segmentation array or the moveable lenslet arrays. In the present invention the lenslet arrays interact forming an image. The multi-aperture beam integrator 300, uses a segmentation array 120 to segment an incident beam 110 into multiple beamlets 140. The segmentation array segments 130 have a dimension 'd' equal to or less than an associated unit cell on lenslet arrays 310 thru 320. FIG. 7 shows two lenslet arrays, 310 and 320, however this should not be interpreted to limit the number of lenslet arrays that may be used. The lenslets arrays do not have to intercept the entire portion of multiple beams. For example, the variation shown in FIG. 8 illustrates an off-axis system 400 using only a partially intercepted portion of the incident beam. FIG. 8 shows two lenslet arrays 410 and 420, intercepting a portion of the multiple beams 140 forming an image 430 of size "S." Such a configuration might be used in an alignment system where only a portion of the laser energy is used to form an alignment-dependent image. In FIG. 7, the lenslet arrays 310 and 320 interact with the incident multiple beams 140 resulting in illumination beams 160 that will cross and form a complex image 370 of size 'S', a distance 'F1' from the lenslet array 320. The phase functions of lenslet arrays 310 and 320 add resulting in the creation of complex images. Moving the lenslet arrays with respect to each other results in continuously varying images. For example, using the formulas derived above, and using a device in accordance with the present invention one can create a continuously varying rectangular image. One of ordinary skill in the art may also associate plural lenslet arrays 410, 420 with a single segmentation array 120 and the discussion herein should not be interpreted to limit the association of the segmentation array with the plural lenslet arrays.

EXAMPLE 1

Continuously Variable Rectangular Image

As an example of phase function addition, consider the beam integrator shown in FIG. 6, using only two moveable lenslet arrays. The segmentation array 120 forms an array of Galilean telescopes or a diffractive beam splitter and collimator lens combination. The array of Galilean telescopes is generally more compact and is shown in the figures. This array collects the incoming light with 100% fill factor, segments the light into multiple beamlets and reduces the beam diameters in order to prevent vignetting at the following movable arrays. The second and third array elements 210, 220 each contain a plurality of an amorphic lenslets in a unit cell containing sets of four unique lenslets with different phase functions. Each lenslet on the second array is paired with a lenslet on the third array, which also has a different phase function. In this example, consider the phase functions for a pair of lenslets to be given by;

$$\Phi_1 = Ax^2 + Bx^3 + Cy^2 + Dy^3$$

$$\Phi_2 = -Ax^2 - Bx^3 - Cy^2 - Dy^3$$

Figure 9A:
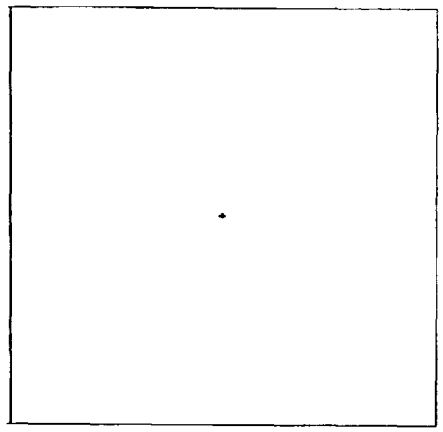
FIGS. 9A–9F illustrate point, linear, and rectangular cross-sectional illumination patterns that may be created by an embodiment of the present invention using two moveable arrays.
Figure 9B:
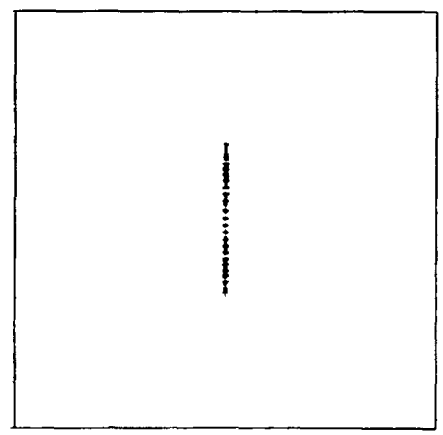
Figure 9C:
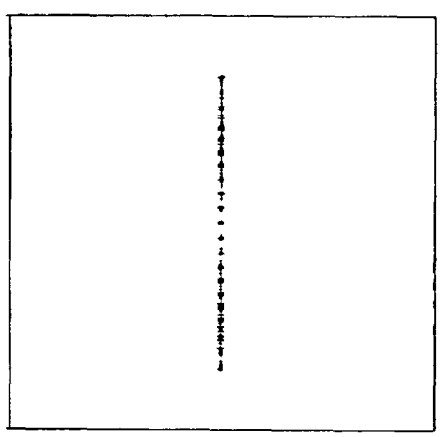
Figure 9D:
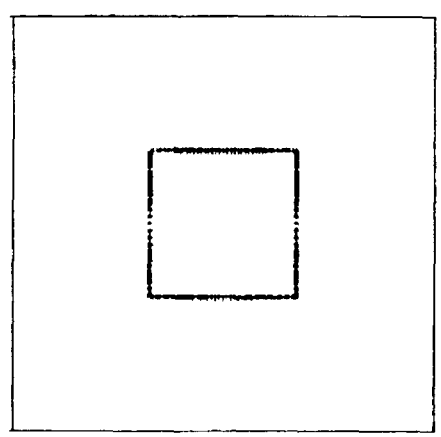
Figure 9E:
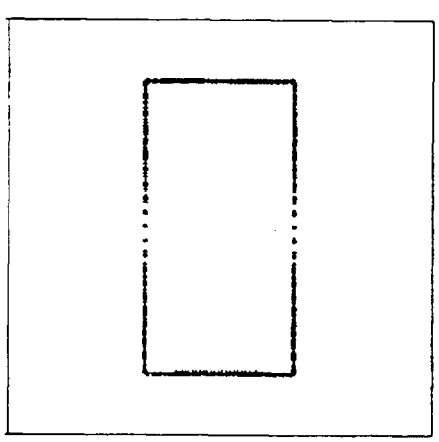
Figure 9F:
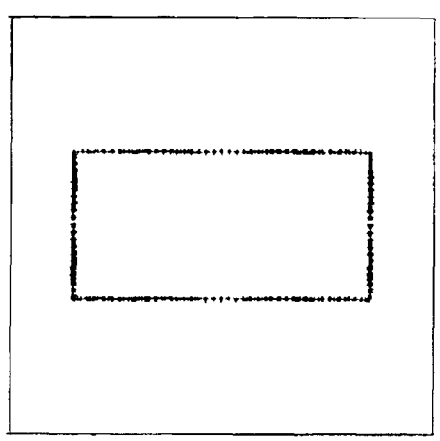
Figure 10A:
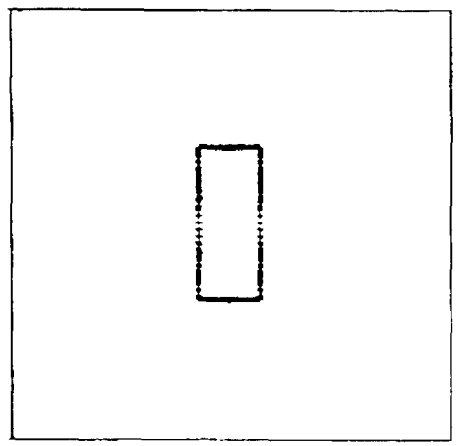
FIGS. 10A–10F illustrate various cross-sectional patterns created by an embodiment of the present invention using three moveable arrays.
Figure 10B:
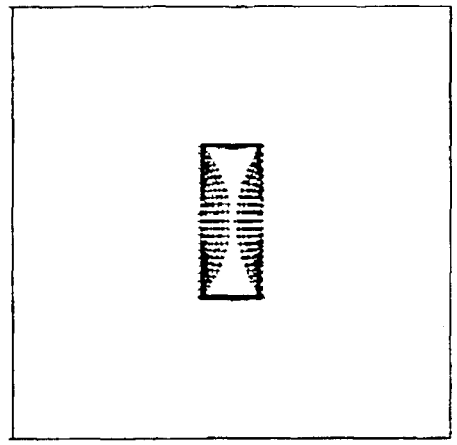
Figure 10C:
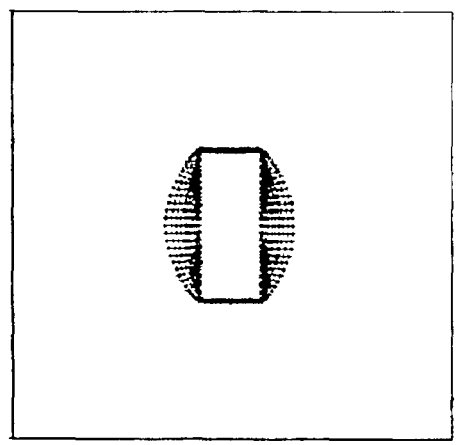
Figure 10D:
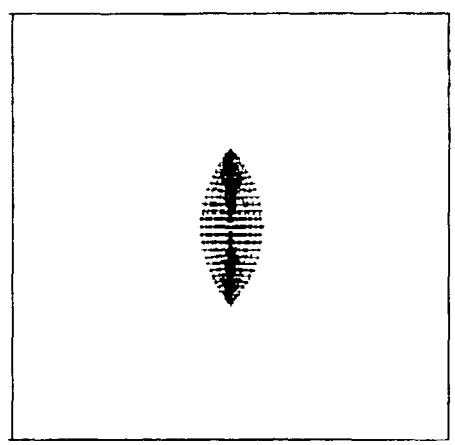
Figure 10E:
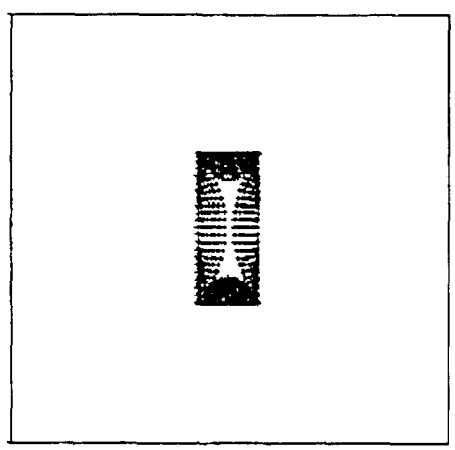
Figure 10F:
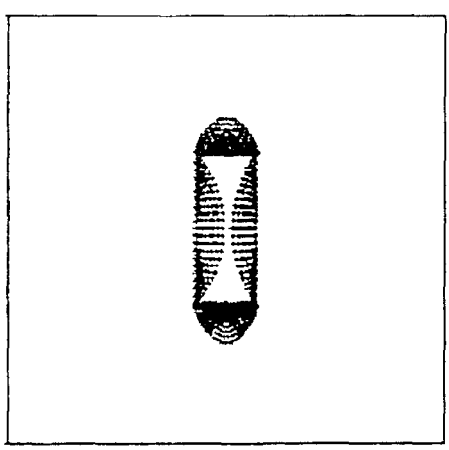

A cluster of four lenslets, with values for the coefficients given in Table 1, will produce a continuously variable rectangle image when the arrays are laterally translated in opposite directions relative to each other. Each of the four-lenslet pairs produces one line segment of the rectangular image. For example, one set of lenslet pairs will create the left side of the rectangle, a second set the right side, a third set the top side, and a fourth set the bottom side of the rectangle. All four lenslet pairs combine to form the four sides of a rectangular shapes shown in FIGS. 9A through 9F when the two arrays are laterally translated in opposite direction by the amounts shown in Table 2. Note, FIG. 9A, formed with zero translation, is the rectangular image with zero width and zero height. In which all four sides overlap at the same point. Varying the amount of translation in x and y changes the phase function of each lenslet pair and allows for continuously varying the shape and aspect ratio of the rectangular image, from the point in FIG. 9A to all the other shapes in FIGS. 9B through 9F. The cubic terms in the above phase functions produce a linearly varying defocus or line image of varying length such as the variation in linear length shown in FIGS. 9B and 9C. The quadratic and square terms produce a linearly varying displacement for the line segments, moving the line segments closer or further from the center as the rectangle shrinks or grows, resulting in variation of the image shapes as the lateral translation between lenslet arrays is varied. It would be obvious to one of ordinary skill in the art to modify the lenslet shapes and/or movement of the unit cells and lenslet arrays, in accordance with the described process and equations herein, to result in alternative variable illuminated patterns at desired locations and the discussion herein should not be interpreted to limit the method of movement, coefficient values, shapes of lenslet arrays, or shapes of lenslets. For example, one of ordinary skill in the art would know to vary the coefficients of terms in the described equations, to create alternative image shapes other than the ones shown in FIGS. 9 and 10.

TABLE 1

Coefficients for variable rectangle example

|   | Lens 1 | Lens 2 | Lens 3 | Lens 4 |
|---|---|---|---|---|
| A | 0 | 0 | 310 | −310 |
| B | 300 | 300 | 0 | 0 |
| C | 310 | −310 | 0 | 0 |
| D | 0 | 0 | 300 | 300 |

TABLE 2

Lateral decenters, in opposite directions, for the two arrays to produce the shapes in FIG. 9.

| FIG. | X decenter (mm) | Y decenter (mm) |
|---|---|---|
| A | 0.0 | 0.0 |
| B | 0.0 | 0.05 |
| C | 0.0 | 0.1 |
| D | 0.05 | 0.05 |
| E | 0.05 | 0.1 |
| F | 0.1 | 0.05 |

As previously mentioned, FIGS. 9A–9F illustrate the use of a device according to the present invention as described by the example above. The lenslet arrays are laterally translated with respect to each other to produce the illumination patterns shown in FIGS. 9A through 9F. The transition between illumination patterns is continuous, depending only on the amount of lateral translation of the arrays. It is noted that, depending on the overall magnification of the system, a small movement of the arrays can produce a large change in the pattern.

EXAMPLE 2

Continuously Variable Rectangle Image with Edge Thickening

As a further example of creating a variable phase function with moveable lenslet arrays, consider the beam integrator of FIG. 6 with three moveable arrays in which each triplet of lenslets have the following phase functions:

$$\Phi_1 = Ax^2 + Bx^3 + Cy^2 + Dy^3$$

$$\Phi_2 = -Ax^2 - Bx^3 - Cy^2 - Dy^3 - Ex^4 - Fy^4$$

$$\Phi_3 = Ex^4 + Fy^4$$

and the coefficients for each of the four groups of lenslets, or beamlets, in the unit cell are given by Table 3.

TABLE 3

Coefficients for variable rectangle example with edge thickening.

|   | Lens 1 | Lens 2 | Lens 3 | Lens 4 |
|---|---|---|---|---|
| A | 0 | 0 | 310 | −310 |
| B | 300 | 300 | 0 | 0 |
| C | 310 | −310 | 0 | 0 |
| D | 0 | 0 | 300 | 300 |
| E | 0 | 0 | −200 | 200 |
| F | −200 | 200 | 0 | 0 |

It is clear from the phase functions that if the third moveable array remains fixed relative to the second, the patterns will be identical to those produced by example 1. However, if the third array is also translated relative to the second array, the patterns of FIGS. 10A–F will be produced. The relative x and y decenters between the first and second array, and between the second and third array, producing the six patterns shown in FIGS. 10A–F, are given in Table 4.

TABLE 4

Lateral decenters, in opposite directions, for the three arrays to produce the shapes in FIG. 10.

| FIG. | X1 decenter (mm) | Y1 decenter (mm) | X2 decenter (mm) | Y2 decenter (mm) |
|------|------------------|------------------|------------------|------------------|
| A | 0.02 | 0.05 | 0.0 | 0.0 |
| B | 0.02 | 0.05 | 0.07 | 0.0 |
| C | 0.02 | 0.05 | −0.07 | 0.0 |
| D | 0.0 | 0.05 | 0.07 | 0.0 |
| E | 0.02 | 0.05 | 0.07 | 0.07 |
| F | 0.02 | 0.05 | 0.07 | −0.07 |

The relative decenters between the second and third array, given as x2 and y2 decenters in Table 4, produce either an inward or outward-turned thickening of the sides of the rectangle image.

Other various illumination patterns can be realized with other variations of the lenslet design and phase functions. For example, unit cells could be moved independently using a method as illustrated in FIGS. 3 and 4, or additional lenslets could be incorporated into the unit cell. Higher order terms could be included in the phase functions. Additional lenslet arrays could be added for increased degrees of freedom. Many various illumination patterns can be realized and the discussion herein should not be interpreted to limit the illumination patterns achievable by the present invention. Additional variations can be achieved by varying the other terms in the phase functions and the discussion herein should not be interpreted to limit variation in only the phase terms presented in the equations.

Many variations of the use of phase interacting lenslet arrays using refracted, reflected, and diffracted waves can be realized in accordance with the present invention. Various changes to the invention described above will be appreciated by one of ordinary skill in the art. For example, a multiple substrate lenslet array containing many layers of various lenslets may be substituted for a lenslet array. The system may be folded in a reflective design. Such variations are not to be regarded as a departure from the spirit and scope of the invention. Therefore, the invention is not limited by the foregoing description but is defined solely by the appended claims.

What is claimed is:

1. A multi-lenslet beam integrator comprising:
    a first optical array element including a plurality of substantially planar unit cells arranged to be in an array plane associated with $x_1$-$y_1$ plane, each of said unit cells being oriented across an intended irradiation path and including at least one lenslet;
    a second optical array element including a plurality of substantially planar unit cells arranged to be in an array plane associated with a $x_2$-$y_2$ plane, each of said unit cells being oriented across the intended irradiation path and including at least one lenslet; and
    at least one actuator to vary the relative position between said first and second optical array elements,
    said unit cells producing output unit cell irradiation patterns which collectively form a single integrated irradiation pattern at the output of said integrator.

2. The multi-lenslet beam integrator of claim 1 further comprising an integrator lens arranged in said intended irradiation path.

3. The multi-lenslet beam integrator of claim 1 further comprising a segmentation array element arranged in said irradiation path upstream from said first and second optical array elements and separating an irradiation beam into multiple irradiation sub-beams separated by lower irradiation intensity regions, said irradiation sub-beams each being supplies to a said unit cell of said first optical array.

4. The multi-lenslet beam integrator of claim 1 further comprising an integrator lens arranged in said intended irradiation path; and
    a segmentation array element arranged in said irradiation path upstream from said first and second optical array elements and separating an irradiation beam into multiple irradiation sub-beams separated by lower irradiation intensity regions, said irradiation sub-beams each being supplied to a said unit cell of said first optical array.

5. The multi-lenslet beam integrator of claim 1, wherein said actuator continuously varies the spacing between said first and second optical array elements.

6. The multi-lenslet beam integrator of claim 1, wherein said actuator continuously varies the amount of offset in the array plane of at least one of said first and second optical array elements with respect to a centerline of said irradiation path.

7. The multi-lenslet beam integrator of claim 1, wherein said actuator tilts the array plane of at least one of said first and second optical array elements with respect to a centerline of said irradiation path.

8. The multi-lenslet beam integrator of claim 1, wherein said actuator rotates one of said first and second optical array elements with respect to the other.

9. The multi-lenslet beam integrator of claim 1, wherein said actuator continuously varies the output irradiation path downstream of said first and second optical array elements.

10. The multi-lenslet beam integrator of claim 1, wherein each said unit cell includes a plurality of lenslets.

11. The multi-lenslet beam integrator according to claim 3, wherein said segmentation array element comprises an assemblage of afocal telescopes.

12. The multi-lenslet beam integrator according to claim 3, wherein said beams are each substantially parallel to the intended irradiation path and have a cross-sectional dimension sized so as to substantially entirely pass through at least one said lenslet.

13. The multi-lenslet beam integrator according to claim 3, wherein said segmentation array element includes a diffractive beam splitter and wedges or a diffractive beam splitter and collimator lens to produce multiple separated parallel beams.

14. The multi-lenslet beam integrator according to claim 3, wherein said beams are each parallel to said axis and have a cross-sectional dimension smaller than a smallest planar dimension of one of said lenslets.

15. The multi-aperture beam integrator according to claim 1, wherein said lenslet(s) apertures is/are circularly or ellipsoidal shaped within their respective unit cell and said unit cell is moveable with respect to another unit cell.

16. The multi-aperture beam integrator according to claim 1, wherein said lenslet(s) apertures is/are polygon shaped within their respective unit cell and said unit cell is moveable with respect to another unit cell.

17. The multi-aperture beam integrator according to claim 1, wherein said optical array element is a plurality of substantially planar unit cells arranged to be in an array plane, each of said unit cells being oriented across an intended irradiation direction and including at least one lenslet; and an actuator to move at least one of said unit cells with respect to at least one other unit cell, the movement of said at least one unit cell varying the optical pattern formed by passing an irradiation beam through said optical array element, in said plane and wherein each unit cell comprises at least one lenslet where each unit cell is defined as a smallest group of lenslets, which are identically replicated on said optical array element, and wherein each optical array element translates and/or rotates.

18. The multi-aperture beam integrator according to claim 1, wherein a first lenslet has a first phase function $\Phi_1$, in a first optical array element, expressed as $$\Phi_1 = \sum_{i=0}^{m} \sum_{j=0}^{n} a_{i,j} x^i y^j,$$

where $x_1$ and $y_1$ are coordinate positions in the $x_1$-$y_1$ plane, where $a_{ij}$ is a coefficient associated with the respective powers "i" and "j" of the $x_1$ and $y_1$ coordinates respectively, and a second lenslet in a second optical array element having a second phase function $$\Phi_2 = \sum_{i=0}^{m} \sum_{j=0}^{n} b_{i,j} x^i y^j,$$

where $x_2$ and $y_2$ are coordinate positions in the $x_2$-$y_2$ plane, where $b_{ij}$ is a coefficient associated with the respective powers "i" and "j" of the $x_2$ and $y_2$ coordinates respectively for the second lenslet, where the first and second lenslets are paired to intentionally form an image, and the total phase function combination is expressed as $\Phi_{total} = \Phi_1 + \Phi_2$.

19. The multi-aperture beam integrator according to claim 18, wherein $a_{i,j} = b_{i,j}$.

20. The multi-aperture beam integrator according to claim 18, wherein $|a_{i,j}| \neq |b_{i,j}|$.

21. The multi-aperture beam integrator according to claim 18, wherein $a_{i,j} = -b_{i,j}$.

22. The multi-aperture beam integrator according to claim 18, wherein the phase functions are not equal between lenslets.

23. An optical array element comprising:

a plurality of substantially planar unit cells arranged to be in an array plane, each of said unit cells being oriented across an intended irradiation direction and including at least one lenslet; and an actuator to move at least one of said unit cells with respect to at least one other unit cell, the movement of said at least one unit cell varying the optical pattern formed by passing an irradiation beam through said optical array element in said plane and wherein each unit cell comprises at least one lenslet where each unit cell is defined as a smallest group of lenslets, which are identically replicated on said optical array element, and wherein each optical array element translates and/or rotates.

24. A method of producing variable shape light intensities at a desired location comprising:

a.) providing at least a first optical array element, wherein said first optical array element including, a plurality of substantially planar unit cells arranged to be in an array plane, each of said unit cells being oriented across an intended irradiation direction and including at least one lenslet;

b.) passing a light through said first optical array element; and c.) moving an actuator to move at least one of said unit cells with respect to at least one other unit cell, the movement of said at least one unit cell varying the optical pattern formed by passing an irradiation beam through said first optical array element in said plane and wherein each unit cell comprises at least one lenslet where each unit cell is defined as a smallest group of lenslets, which are identically replicated on said first optical array element, and wherein each optical array element translates and/or rotates.

25. A method of producing variable shape light intensities at a desired location comprising:

a.) providing a first optical array element including a plurality of substantially planar unit cells arranged to be in an array plane associated with a $x_1$-$y_1$ plane, each of said unit cells being oriented across an intended irradiation path and including at least one lenslet;

b.) providing a second optical array element including a plurality of substantially planar unit cells arranged to be in an array plane associated with a $x_2$-$y_2$ plane, each of said unit cells being oriented across the intended irradiation path and including at least one lenslet;

c.) providing at least one actuator to vary the relative position between said first and second optical array elements, said unit cells producing output unit cell irradiation patterns which collectively form a single integrated irradiation pattern at the output of said integrator;

d.) providing an integrator lens arranged in said intended irradiation path of said first and second optical array elements;

e.) passing a light through said first and second optical array elements, where said first and second optical array elements result in the formation of an intensity pattern at a desired location; and f.) moving said actuators to vary the relative position to continuously vary the intensity patterns at the desired location.

26. The method according to claim 25 further comprising:
providing an integrator lens arranged in said intended irradiation path of said first and second optical array elements.

27. The method according to claim 25 further comprising:
providing a segmentation array element arranged in said irradiation path upstream from said first and second optical array elements and separating an irradiation beam into multiple irradiation sub-beams separated by lower irradiation intensity regions, said irradiation sub-beams each being supplied to a said unit cell of said first optical array.

28. The method according to claim 25 further comprising:
providing an integrator lens arranged in said intended irradiation path of said first and second optical array elements; and
providing a segmentation array element arranged in said irradiation path upstream from said first and second optical array elements and separating an irradiation beam into multiple irradiation sub-beams separated by lower irradiation intensity regions, said irradiation sub-beams each being supplies to a said unit cell of said first optical array.

29. The method according to claim 25, wherein said actuator continuously varies the spacing between said first and second optical array elements.

30. The method according to claim 25, wherein said actuator continuously varies the amount of offset in the array plane of at least one of said first and second optical array elements with respect to a centerline of said irradiation path.

31. The method according to claim 25, wherein said actuator tilts the array plane of at least one of said first and second optical array elements with respect to a centerline of said irradiation path.

32. The method according to claim 25, wherein said actuator rotates one of said first and second optical array elements with respect to the other.

33. The method according to claim 25, wherein said actuator continuously varies the output irradiation path downstream of said first and second optical array elements.

34. The method according to claim 25, wherein each said unit cell includes a plurality of lenslets.

35. The method according to claim 27, wherein said segmentation array element comprises an assemblage of afocal telescopes.

36. The method according to claim 27, wherein said beams are each substantially parallel to the intended irradiation path and have a cross-sectional dimension sized so as to substantially entirely pass through at least one said lenslet.

37. The method according to claim 27, wherein said segmentation array element includes a diffractive beam splitter and wedges or a diffractive beam splitter and collimator lens to produce multiple separated parallel beams.

38. The method according to claim 27, wherein said beams are each parallel to said axis and have a cross-sectional dimension smaller than a smallest planar dimension of one said lenslet.

39. The method according to claim 25, wherein said lenslet(s) is/are rectangular within their respective unit cell and said unit cell is moveable with respect to another unit cell.

40. The method according to claim 25, wherein said lenslet(s) is/are cylindrical within their respective unit cell and said unit cell is moveable with respect to another unit cell.

41. The method according to claim 25, wherein said optical array element is a plurality of substantially planar unit cells arranged to be substantially in an array plane, each of said unit cells being oriented across an intended irradiation direction and including at least one lenslet;

an actuator to move at least one of said unit cells with respect to at least one other unit cell, the movement of said at least one unit cell varying the optical pattern formed by passing an irradiation beam through said optical array element, in said plane and wherein each unit cell comprises at least one lenslet where each unit cell is defined as a smallest group of lenslets, which are identically replicated on said optical array element, and wherein each optical array element translates and/or rotates.

42. The method according to claim 25, wherein a first lenslet has a first phase function, $\Phi_1$, in a first optical array element, expressed as $$\Phi_1 = \sum_{i=0}^{m}\sum_{j=0}^{n} a_{i,j} x^i y^j,$$

where x and y are coordinate positions in the $x_1$-$y_1$ plane, where $a_{i,j}$ is a coefficient associated with the respective powers "i" and "j" of the $x_1$ and $y_1$ coordinates respectively, and a second lenslet in a second optical array element having a second phase function $$\Phi_2 = \sum_{i=0}^{m}\sum_{j=0}^{n} b_{i,j} x^i y^j,$$

where $x_2$ and $y_2$ are coordinate positions in the $x_2$-$y_2$ plane, where $b_{i,j}$ is a coefficient associated with the respective powers "i" and "j" of the $x_2$ and $y_2$ coordinates respectively for the second lenslet, where the first and second lenslets are paired to intentionally form an image, and the total phase function combination is expressed as $\Phi_{total}=\Phi_1+\Phi_2$.

43. The method according to claim 42, wherein $a_{i,j}=b_{i,j}$.

44. The method according to claim 42, wherein $|a_{i,j}|\neq|b_{i,j}|$.

45. The method according to claim 42, wherein $a_{i,j}=-b_{i,j}$.

46. The method according to claim 42, wherein the phase functions are not equal between lenslets.

47. The method according to claim 25 further including, a.) providing a third optical array element including a plurality of generally planar unit cells arranged to be generally in an array plane, each of said unit cells being oriented across an intended irradiation path and including at least one lenslet, where said third optical array element is moveable with respect to at least one of said first or second optical array elements by moving an actuator.

48. The multi-aperture beam integrator according to claim 1, wherein a first lenslet has a phase function, $\Phi_1$, in a first optical array element, expressed as $$\Phi_1 = \sum_{i=0}^{m}\sum_{j=0}^{n} a_{i,j} x^i y^j,$$

where $x_1$ and $y_1$ are coordinate positions in the $x_1$-$y_1$ plane, where $a_{i,j}$ is a coefficient associated with the respective powers "i" and "j" of the $x_1$ and $y_1$ coordinates respectively, and a second lenslet in a second optical array element having a second phase function $$\Phi_2 = \sum_{i=0}^{m}\sum_{j=0}^{n} b_{i,j} x^i y^j,$$

where $x_2$ and $y_2$ are coordinate positions in the $x_2$-$y_2$ plane, where $b_{i,j}$ is a coefficient associated with the respective powers "i" and "j" of the $x_2$ and $y_2$ coordinates respectively for the second lenslet, subsequent lenslet arrays have similar phase functions, where there are N arrays, and where the total phase function combination is expressed as $\Phi_{total}=\Phi_1+\Phi_2+\ldots+\Phi_N$.

* * * * *